US010124757B1

(12) United States Patent
Kerr et al.

(10) Patent No.: US 10,124,757 B1
(45) Date of Patent: Nov. 13, 2018

(54) VEHICLE COLLISION AVOIDANCE SYSTEM

(71) Applicant: Traffic Safety Specialists Inc., Irvine, CA (US)

(72) Inventors: Joseph V. Kerr, Coto de Caza, CA (US); Jeffrey M. Greeney, Aliso Viejo, CA (US)

(73) Assignee: Traffic Safety Specialists Inc., Irvine, CA (US)

(*) Notice: Subject to any disclaimer, the term of this patent is extended or adjusted under 35 U.S.C. 154(b) by 30 days.

(21) Appl. No.: 15/217,366

(22) Filed: Jul. 22, 2016

Related U.S. Application Data

(60) Provisional application No. 62/196,189, filed on Jul. 23, 2015.

(51) Int. Cl.
*B60Q 1/00* (2006.01)
*B60R 21/0136* (2006.01)
*B60Q 1/52* (2006.01)
*B60R 21/00* (2006.01)
*B60R 21/01* (2006.01)

(52) U.S. Cl.
CPC ............ *B60R 21/0136* (2013.01); *B60Q 1/52* (2013.01); *B60R 2021/0027* (2013.01); *B60R 2021/0104* (2013.01)

(58) Field of Classification Search
CPC ........ B60R 21/0136; B60R 2021/0027; B60R 2021/0104; B60Q 1/52
USPC .................................. 340/435, 436; 701/301
See application file for complete search history.

(56) References Cited

U.S. PATENT DOCUMENTS

| 3,295,101 | A | * | 12/1966 | Ellis | B60Q 1/445 180/171 |
| 4,205,619 | A | * | 6/1980 | Mock, Jr. | B63B 21/56 114/242 |
| 7,289,786 | B2 | * | 10/2007 | Krasner | G08B 25/016 340/436 |
| 8,374,721 | B2 | * | 2/2013 | Halloran | A47L 5/30 700/245 |
| 9,437,109 | B1 | * | 9/2016 | Stafford | F21L 4/02 |
| 2003/0201886 | A1 | * | 10/2003 | Robbins | B60Q 1/52 340/471 |
| 2012/0235810 | A1 | * | 9/2012 | McMeekin | B60Q 1/2657 340/473 |
| 2013/0194087 | A1 | * | 8/2013 | Tomer | G08G 1/205 340/436 |
| 2014/0009275 | A1 | * | 1/2014 | Bowers | B60Q 1/00 340/436 |
| 2015/0314723 | A1 | * | 11/2015 | Ghiata | B60Q 1/46 340/471 |

(Continued)

*Primary Examiner* — Kerri McNally
*Assistant Examiner* — Thang Tran
(74) *Attorney, Agent, or Firm* — Knobbe Martens Olson & Bear LLP (57) ABSTRACT

Vehicle collision avoidance and vehicle alert systems and methods that enhance awareness by surrounding vehicles of a host vehicle involved in an accident are provided. Embodiments of the safety system include a plurality of flares that are automatically deployed upon impact with the host vehicle, a back-up vehicle battery, lighting systems at the front, back, top, bottom, and/or windows of the vehicle, and/or an automated notification system configured to quickly and accurately inform emergency personnel of the location and severity of the accident.

20 Claims, 5 Drawing Sheets

(56) References Cited

U.S. PATENT DOCUMENTS

2016/0186971 A1* 6/2016 Selevan .................. F21L 2/00
362/234

* cited by examiner

VEHICLE COLLISION AVOIDANCE SYSTEM

CROSS-REFERENCE TO RELATED APPLICATIONS

This application claims the benefit of priority to U.S. Application No. 62/196,189 filed Jul. 23, 2015, which is hereby incorporated by reference in its entirety herein. Any and all priority claims identified in the Application Data Sheet, or any correction thereto, are hereby incorporated by reference under 37 CFR 1.57.

BACKGROUND

Technical Field

Devices, systems and methods for a vehicle alert system configured for reducing the likelihood of an initial or a secondary collision to a motor vehicle involved in an accident and for enhancing the efficiency of an emergency response.

Description of the Related Art

Vehicles can become disabled, stop, stalled, or inoperative for any number of reasons, such as through pulling to the side of a road and/or involvement in an accident. Once a vehicle is stopped and/or inoperative whether by intent or by accident, other vehicles passing through the site may strike the vehicles or driver/passenger/accident victims from the initial vehicle. In some circumstances, such as after an initial accident or collision, the subsequent collision is sometimes referred to as a "secondary collision." Secondary collisions are particularly dangerous because accident victims are vulnerable to further injury due to a number of factors including physical injuries sustained in the initial accident, disorientation, a reduced ability of the damaged vehicle to protect the accident victims, and the presence of the accident victims alongside the road and outside of their vehicle following the initial accident.

SUMMARY

There is a need for devices, systems and methods for a vehicle alert system that provides additional safety measures that can be deployed and/or activated to protect victims of motor vehicles in response to an incident, such as when the vehicle is stopped, stalled, inoperative, operating under reduced capacity, and/or after they have been involved in an accident. Certain embodiments described herein are directed to systems, methods and apparatuses for alerting emergency personnel, passing motorists, and/or personal contacts of the driver (or passengers) that a motor vehicle incident and/or accident has occurred. However, it will be appreciated that the systems, methods and apparatuses may have applications in other fields. For example, in some embodiments, the systems, methods and apparatuses may be used on construction, port/loading equipment, aircraft, farming equipment, waste management equipment, rail equipment, trains, ships, boats, and/or non-motor vehicles such as bicycles or animal-powered carriages.

BRIEF DESCRIPTION OF THE DRAWINGS

These and other features, aspects and advantages will now be described in connection with certain embodiments, in reference to the accompanying drawings. The illustrated embodiments, however, are merely examples and are not intended to be limiting. The following are brief descriptions of the drawings.

DETAILED DESCRIPTION

Described below are various embodiments of a vehicle safety system and/or a vehicle alert system for protecting occupants following an incident, such as a stall, an accident or other reasons for a vehicle to stop or slow down, thereby reducing the likelihood of a secondary accident. In some aspects, the present disclosure relates to devices and systems that deploy safety countermeasures in response to an incident with a vehicle.

Embodiments in the present disclosure also relate to vehicle alert systems that increase awareness of a vehicle incident, such as an accident, thereby reducing the likelihood that passing motorists may strike a disabled vehicle or accident victim, and also reducing the time required for emergency responders to reach accident victims. In some embodiments, an occupant (driver, passenger) of a vehicle can activate a system in response to an incident, such as a stall, stop, collision, accident, impairment to the vehicle, and/or stopping the vehicle. In some embodiments, the vehicle alert system automatically activates one or more safety alert components in response to an incident. In some aspects, an emergency/911 operator and/or emergency responder can receive notification of an airbag deployment, heat sensor, impact sensor, and/or user activation of a signal from a registered vehicle with various embodiments of the vehicle alert system. In one embodiment, the operator can see the mobile number corresponding to the registered vehicle and can contact the vehicle owner. This can allow emergency responders to quickly gain information regarding the severity of the emergency. Some aspects of the present disclosure can alleviate delayed or inaccurate information regarding an accident by utilizing automated responses sent from the vehicle's safety system (such as, in some embodiments, a GPS system) rather than relying on verbal descriptions by victims or bystanders in contacting emergency personnel. Victims and bystanders are often in an excited state and may not readily know the location of the accident. Moreover, many accidents are reported by mobile phones, which do not benefit from the residence or business address information that has been imbedded in landline phone systems. As a result, an emergency dispatcher receiving a mobile call reporting an accident is placed in a situation similar to the 1970's when trying to confirm the location of the emergency. The present disclosure provides embodiments of systems that allow for quick and accurate reporting and response to an accident.

Figure 1:
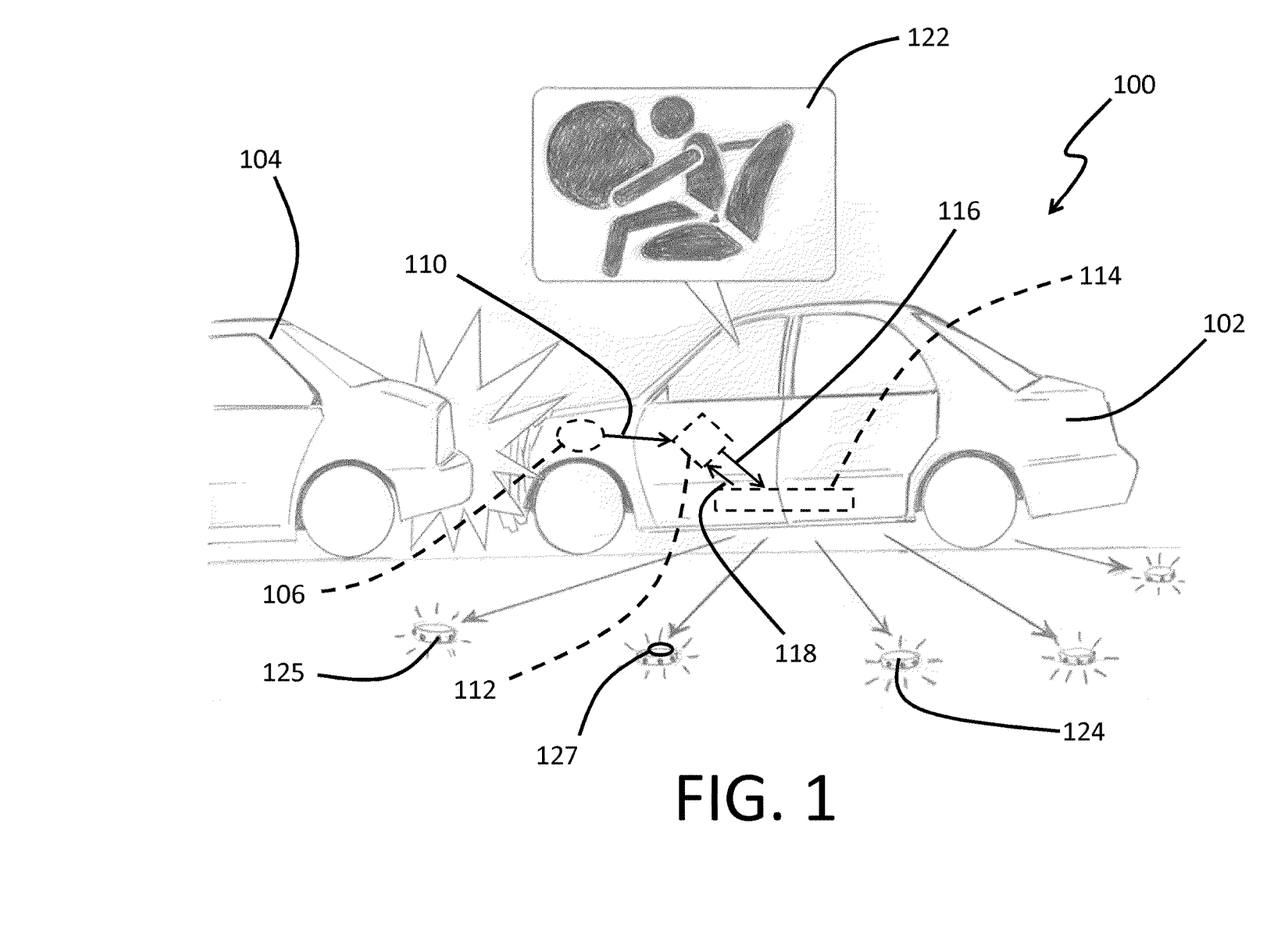
FIG. 1 is a schematic representation of an embodiment of the system being deployed following a motor vehicle accident.

FIG. 1 depicts an embodiment of a vehicle alert system 100. The system 100 can be mounted on a host vehicle 102.

The system 100 can be configured to be activated under any one, two, more, and/or all incident circumstances. Alternatively, the system 100 can be configured to be activated under a first set of circumstances and not activated under a second set of circumstances. The system 100 can be configured to allow a user to program the circumstances under which the system is activated. Additionally and alternatively, the system 100 may be configured to allow a user to specify which of the components of the system 100 are deployed according to the conditions imposed on the host vehicle 102. For example, the system 100 may be configured to deploy a full panel of the components of the system 100 when the system 100 detects the host vehicle 102 has been involved in a major impact and a lesser panel of the components of the system 100 when the system 100 detects the host vehicle 102 has been involved in a minor impact.

Referring to FIG. 1, the system 100 can be activated when the host vehicle 102 is involved in an impact with a foreign object 104. In various embodiments, the foreign object 104 can be another vehicle or some other part of the environment (e.g., tree, road sign, wall, barrier, etc.). The system 100 can be activated when the host vehicle 102 strikes a foreign object 104. Additionally and/or alternatively, the system 100 can be activated when a foreign object 104 strikes the host vehicle 102. In one embodiment, the system 100 is configured to be activated only when the host vehicle 102 is turned on. In some embodiments, the system can be configured to be activated irrespective of whether the host vehicle 102 is turned on or off.

In various embodiments, the system 100 can include an impact sensor 106. In one embodiment, the impact sensor 106 can be a component of an airbag deployment system of the host vehicle 102. In one embodiment, the impact sensor 106 can be one, two, three or more accelerometer(s) of the system 100 or the host vehicle 102. The impact sensor 106 can be configured to generate an impact signal 110 in response to the impact sensor 106 detecting that the host vehicle 102 has been involved in an impact. In various embodiments, the system 100 can include a heat sensor. A signal from a sensor may be received by a communications interface 112. Additionally and alternatively, a signal may be received by a deployment device 114 or another component of the system 100. Additionally and alternatively, the communications interface 112 may generate a communication signal 116. The communication signal 116 may be received by the deployment device 114 or another component of the system 100. Additionally and alternatively, the deployment device 114 may generate a deployment signal 120 (which is not shown in the figures). The deployment signal 120 may be received by the communications interface 112 or another component of the system 100.

In various embodiments, the communications interface 112 may initiate an emergency notification 122. The emergency notification 122 can include a communication conducted by cell/mobile phone, Bluetooth, radio (e.g., AM, FM or satellite), Wi-Fi, or other communications technology. The emergency notification 122 can include a broadcast that is directed to other vehicles including emergency vehicles within the area or region of the host vehicle 102. In various embodiments, the area or region is 1000, 2000, 3000, 10000 feet or more, and/or 1, 2, 3, 5, 10 or more miles or kilometers. The emergency notification 122 can include a text message or other electronic communication that is directed to family members or to other persons specified and/or pre-programmed by the owner of the host vehicle 102. The system 100 may be configured to allow a user to program or customize the emergency notification 122 that is sent in response to an impact to the host vehicle 100. The emergency notification 122 can include information such as current location of the host vehicle 100. The emergency notification 122 can include information such as latitude and longitude coordinates of the host vehicle 100, GPS position, closest cross streets, intersection, city, state, and police, medical, fire, military, and/or government agency information.

In various embodiments, the system 100 can include one, two, three, four, five, six, seven, eight, ten, or more flares 124 that are deployed by the system 100. The flares 124 can include a powered light source 125. The powered light source 125 can include a light emitting diode (LED). The powered light source 125 can be configured to emit light continuously or to emit light in a flashing pattern. Additionally and alternatively, the flares 124 may include reflective material (e.g., mirrors, reflective tape, etc.) (not shown). In various embodiments, the flares 124 include a power source 127 that supplies power to illuminate the powered light source 125.

In various embodiments, the flares 124 may be stored in one or more compartments (not shown) mounted on the host vehicle 102. The flares 124 can be ejected from the compartment upon the host vehicle 102 being involved in an impact. The system 100 may be configured to deploy the flares 124 from the undercarriage of the host vehicle 102. The system 102 can be configured to scatter the flares 124 laterally/forward/behind away from the host vehicle 102. The system 100 may be configured to deploy the flares 124 upon a component of the system 100 receiving a signal (e.g., an impact signal 110, a communication signal 116, a deployment signal 120) from another component of the system 100. The flares 124 can be deployed upon impact, where impact can include airbag deployment, notification from an accelerometer, or other means. The system 100 can include an accelerometer (not shown) that can adjust the speed for deployment of the flares 124 in order to maximize the scattering of the flares 124, thereby enhancing visibility of the flares 124. The system 100 may be configured to adjust the speed for deployment of the flares 124. For example, the speed for deployment of the flares 124 may be reduced to avoid potential damage to the surrounding area in some situations.

In various embodiments, the flares 124 may be disc shaped or have some other blunted shape that will avoid the flares 124 from damaging the tires of a passing vehicle that drives over the flare 124. The flares 124 may be weighted or have tapered edges to enhance the flares 124 coming to rest quickly after deployment from the host vehicle 102. The flares 124 may be configured to bias the flare 124 coming to rest on a flat surface of a disc-shaped flare 124. The flares 124 may include one or more powered light sources 125 displayed circumferentially around the disc-shaped flare 124.

In various embodiments, the system 100 can include a battery back-up (not shown in the drawings). The battery back-up can be configured to power the system 100. The battery back-up can be configured to provide lighting, communications, and/or a quick vehicle start of the host vehicle 102 for emergencies. For example, if the vehicle battery is low or not functioning, the vehicle operator can activate the battery back-up to help jump start or crack the vehicle battery. In one embodiment, the vehicle operator can activate a switch or indicator to jump start the vehicle batter with the battery back up without leaving the vehicle cabin. In one embodiment, the battery back-up automatically jump starts the vehicle battery when the vehicle battery is not functioning properly. The battery back-up can provide power to the system 100 so that the system 100 need not rely on power from the engine system of the host vehicle 102 in order for the system 100 to function.

Figure 2:
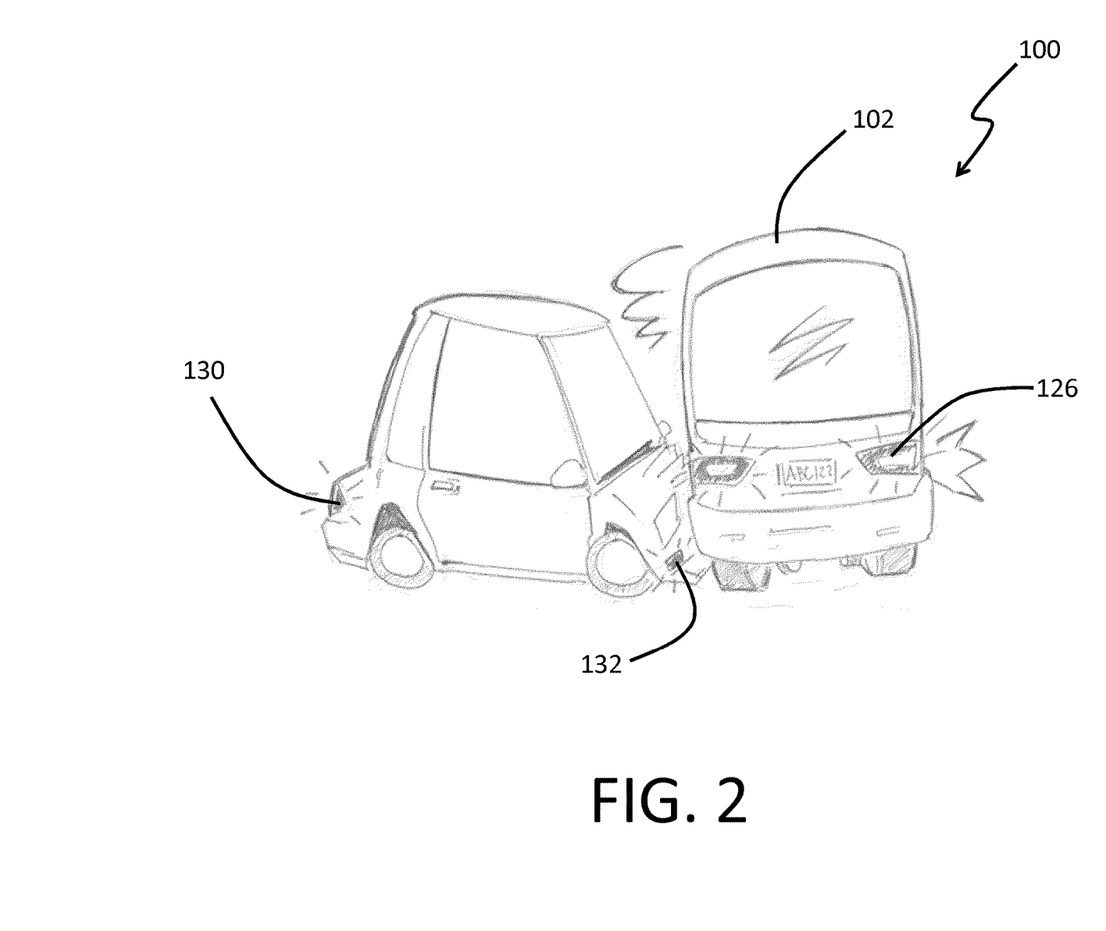
FIG. 2 depicts an embodiment of the system being deployed following a motor vehicle accident.

FIG. 2 depicts an embodiment of the system 100 that is configured to activate exterior and/or interior lights of the host vehicle 102. The system 100 can be configured to activate one or more lights in response to a component of the system 100 sensing the host vehicle 102 has been involved in an impact, or detecting airbag has been deployed, or detecting a signal from a sensor, e.g., one or more accelerometers and/or heat sensors. The system 100 can be configured to illuminate a rear light 126 of the host vehicle 102. The rear light 126 can include a tail light, a brake light, a top rear brake light, a hazard light, a parking light, a running light, a turn signal, or any other rear-facing light. Additionally and alternatively, the system 100 can be configured to illuminate a side light 130. The side light 130 can include a turn signal, a running light, a brake light, or any other laterally facing light. Additionally and alternatively, the system 100 can be configured to illuminate a front light 132. The front light 132 can include a head light, a fog light, a running light, a turn signal, or any other forward facing light. The system 100 can be configured to illuminate a single exterior light or a plurality of exterior lights. The system 100 can be configured to illuminate a single interior light or a plurality of interior lights.

In various embodiments, the system 100 is configured to illuminate the lights in different lighting schemes in order to draw attention to the accident. For example, the system 100 can be configured to illuminate exterior lights in a "wigwag" pattern, where a light on one side of the vehicle is flashed on and off out of phase with a corresponding light on the other side of the vehicle, similar to lights flashing at a railway crossing. In various embodiments, lights of any color (e.g., red, white, yellow, orange, etc.) can be activated. The system 100 can be configured to activate all car lights including four-way (hazard flashes) and flashing headlights. The battery back-up can be configured to power the illumination of the interior and exterior lights in case the main battery or electrical system of the host vehicle 102 is damaged. The battery back-up can power interior lights including map lights, dome lights, door lights, dash lights, and other lights inside the cabin of the host vehicle 102, thereby allowing passengers to extricate themselves from the host vehicle 102 in case of host vehicle 102 overturns, experiences a fuel leak or an electrical arc, or requires a fire or water rescue.

Figure 3:
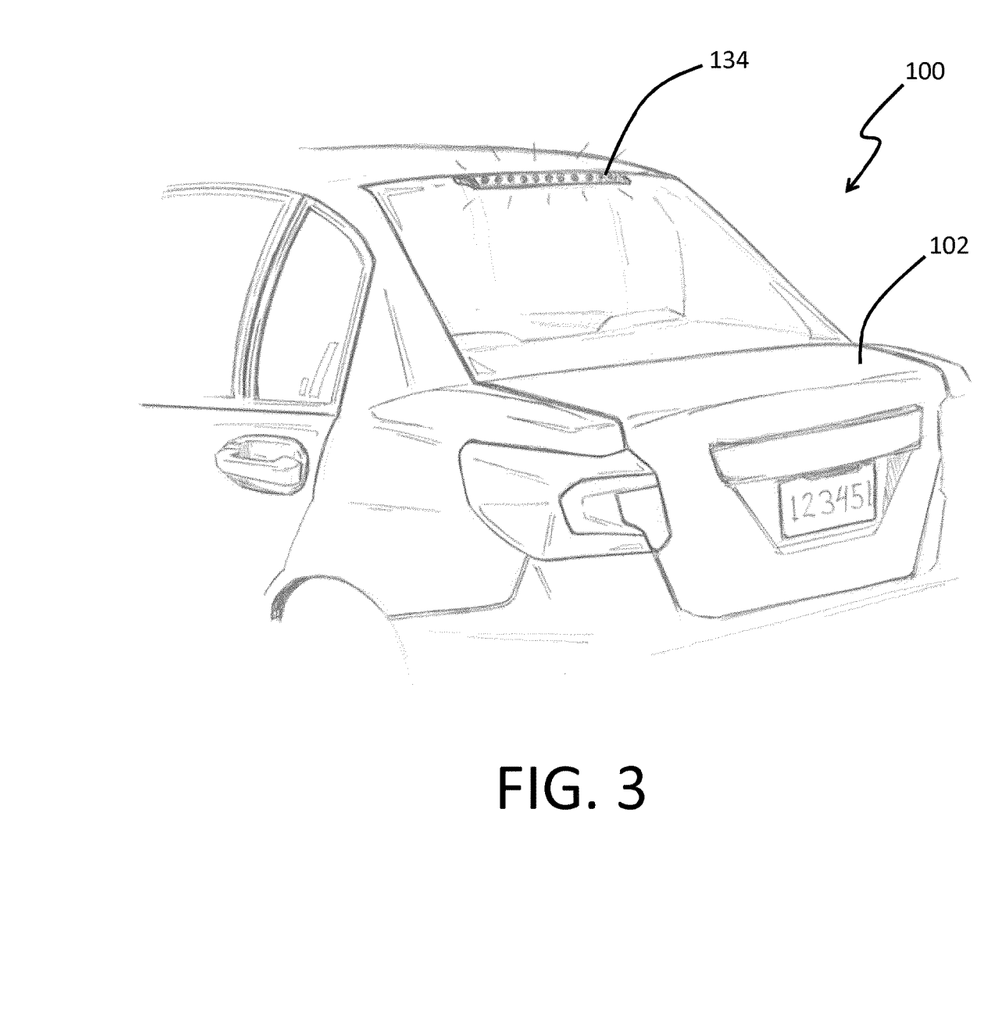
FIG. 3 depicts an embodiment of the system that includes a high rear lighting feature.

Referring to FIG. 3, the system 100 can include a roof light 134. The roof light 134 can include an LED. The roof light 134 can be configured to switch to an LED emergency flasher upon impact or upon receiving a signal from a component of the system 100. The roof light 134 can be powered by the battery back-up of the system 100. The system 100 can be configured to control an existing high or top rear brake light of the host vehicle 100. The system 100 can be configured to cause an existing top rear brake light of the host vehicle 102 to flash upon the host vehicle 102 being involved in an impact. Additionally and alternatively, the system 100 can be configured to control a roof light 134 that is independent of a high top rear brake light of the host vehicle 102.

Figure 4A:
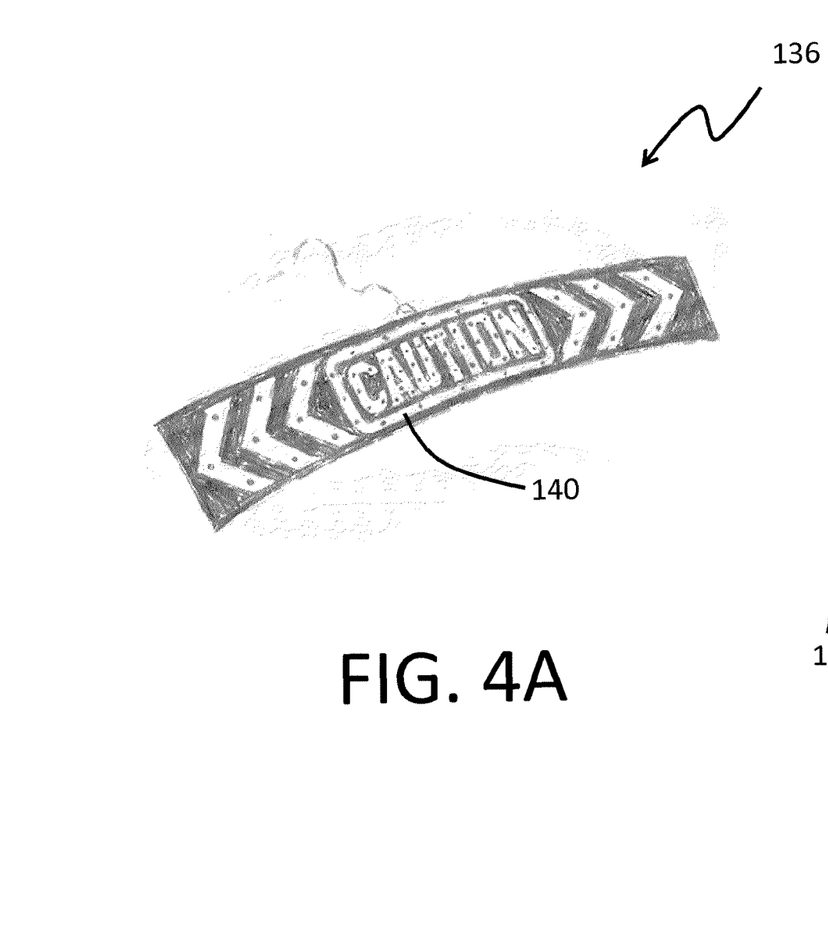
FIG. 4A depicts an embodiment of a banner alert lighting feature.

FIG. 4A depicts a banner 136 lighting feature that can be included in the system 100. The banner 136 can be a window screen, film, or tape lighting. The banner 136 can include a warning display 140 (e.g., "CAUTION", "HAZARD", "EMERGENCY", "HELP", etc.) to alert others to the accident. The banner 136 can be displayed on any or all windows, including front, side, or rear.

Figure 4B:
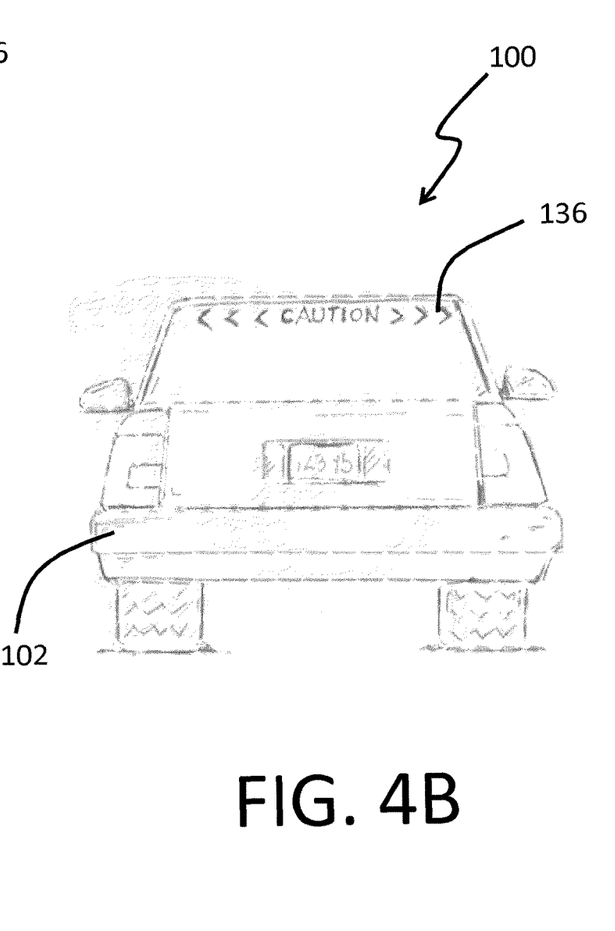
FIG. 4B depicts an embodiment of a banner alert lighting feature mounted on a rear window of a motor vehicle.

FIG. 4B depicts a banner 136 that is disposed along the top edge of the rear window of the host vehicle 102. The banner 136 can be configured to be visible only when the banner 136 is powered by the system 100. In other words, the banner 136 can be translucent when the banner 136 is not energized by the system 100 to illuminate the warning display 140.

Figure 5:
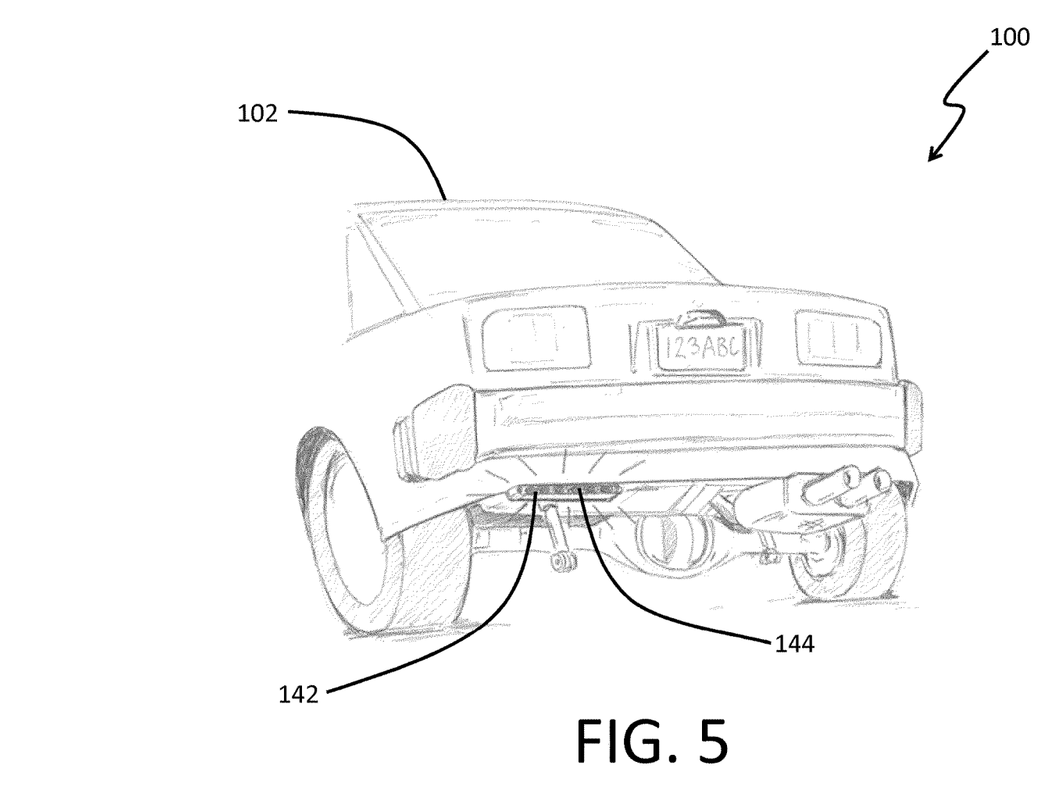
FIG. 5 depicts an embodiment of the system that includes a lighting feature mounted on the vehicle undercarriage.

FIG. 5 depicts a system 100 that includes an undercarriage light 142. In some accidents, the host vehicle 102 may overturn. The system 100 can include an undercarriage light 142 that is configured to be visible when the host vehicle 102 is overturned. In the embodiment depicted in FIG. 5, the undercarriage light 142 is mounted at the rear of the host vehicle 102 and has lighting elements 144 that are directed rearward. However, the system 100 can include one or more undercarriage lights 142 that are mounted at the front or sides of the host vehicle 102, so that the undercarriage light 142 is visible in the event that the host vehicle 102 has rotated in addition to overturning. Additionally and alternatively, the undercarriage light 142 can include lighting elements 144 that are directed in more than one direction. For example, an undercarriage light 142 mounted at the rear of the host vehicle may include lighting elements 144 that are directed to the side of the host vehicle 102.

As discussed above for the other lighting components of the system 100, the undercarriage light 142 can be powered by a battery back-up and can be configured to be illuminated in a flashing, wigwag, or other lighting scheme. Additionally, the undercarriage light 142 can be configured to be activated by deployment of an airbag or in response to a signal generated by a component of the system 100, including a sensor, such as an accelerometer.

The system 100 can be configured so that any or all of the components of the system 100 are electronically, audibly, and/or visually chainable for immediate notification to all vehicles, including emergency vehicles, in a given region or area.

In some embodiments, an auditory alert may activate upon deployment of the vehicle alert system. In various embodiments, the vehicle alert system may be activated by the vehicle operator, by a passenger, or automatically if an incident such as an impact, blow out, roll or accident occurs. In some embodiments, a display and/or speaker in the vehicle can provide visual or text, sound, and/or speaking alerts. For example, in one embodiment, the vehicle alert system is activated and any one, two, or more of the following can occur in any sequence: (a) the battery back-up activates, (b) visual alerts activate (e.g., lights, flare deployment, display on a screen indicating "Vehicle Alert System Activated", etc. according to any of the embodiments described herein); (c) audible alerts activate (e.g., a sound to notify surrounding vehicles and people, an audio signal sent to local emergency response and/or towing and/or personal contacts, a voice in the vehicle that states "vehicle alert system activated" or some other activation notification, "use caution when exiting the vehicle", "watch for other vehicles before exiting", questions to the vehicle operator such as "is anyone hurt?", "do you need an ambulance", "do you need a tow truck?", "would you like to notify your personal contacts?". The system can respond to instructions, and if no response is given, the system can notify emergency personnel, an ambulance, a tow truck, vehicle operator/passenger personal contacts, etc.). In one embodiment, the system notifies vehicle occupants of vehicles approaching (e.g., with blind spot sensors, rear bumper sensors, etc.) and can set off an alarm or tell occupants "watch out for vehicles" etc.).

In various embodiments, the system 100 can be linked to an emergency response system such as a public-safety answering point (PSAP) or local emergency/911 operators. The system 100 can be configured to simultaneously notify the PSAP or local emergency/911 operators as well as notifying directly local or regional emergency vehicles, allowing first responder crews to self-dispatch in response to the notification broadcasted by the system 100. In this way, emergency responders will have an automatic notification before an emergency/911 call is made or before emergency crews are sent by dispatch, thereby saving time and lives. The system 100 can be configured to allow owners of the host vehicle 102 to register their cell phone information so that local law enforcement can contact the owners by, for example, phone or Bluetooth technology in the event of an emergency.

In some embodiments, the system 100 comprises various features that are present as single features (as opposed to multiple features). For example, in one embodiment, the system 100 includes a single component. For example, in various embodiment, the system 100 includes a one, two, three, four, five, six, or more components. Multiple features or components are provided in alternate embodiments. In some embodiments, the system comprises, consists essentially of, or consists of various features and/or components. In some embodiments, the system 100 comprises, consists essentially of, or consists of various features that are not present (e.g., excluding certain components or features).

While the above description has shown, described, and pointed out novel features as applied to various embodiments, it will be understood that various omissions, substitutions, and changes in the form and details of the device or process illustrated may be made without departing from the spirit of the disclosure. Additionally, the various features and processes described above may be used independently of one another, or may be combined in various ways. All possible combinations and subcombinations are intended to fall within the scope of this disclosure.

Some embodiments have been described in connection with the accompanying drawings. In this description, reference is made to the figures wherein like parts are designated with like numerals throughout the description and the drawings. It should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments.

What is claimed is:

1. A vehicle collision avoidance vehicle alert system, comprising:
   an impact sensor configured to generate a signal when the impact sensor detects an impact;
   a deployment device configured to receive the signal from the impact sensor; and
   a housing comprising a flare, wherein the housing is configured to eject the flare from the housing when the deployment device receives the signal from the impact sensor wherein the flare further comprises:
   a LED; and
   a power source configured to power the LED when the flare is ejected from the housing.

2. The system of claim 1, wherein the flare comprises a reflective surface.

3. The system of claim 1, wherein the LED comprises a strobe light.

4. The system of claim 1 further comprising:
   a communications interface configured to receive the signal from the impact sensor, wherein the communications interface initiates an emergency notification in response to receiving the signal from the impact sensor.

5. The system of claim 4, wherein the communications interface initiates a call to an emergency response service upon receiving the signal from the impact sensor.

6. The system of claim 4, wherein the communications interface transmits a broadcast to a nearby vehicle in response to receiving the signal from the impact sensor.

7. The system of claim 4, wherein the communications interface causes an exterior light of a host vehicle to illuminate.

8. The system of claim 7, wherein the exterior light comprises a hazard light.

9. The system of claim 7, wherein the exterior light comprises a tape lighting disposed on a window of the host vehicle.

10. The system of claim 7, wherein the exterior light comprises an emergency light mounted on an undercarriage of the host vehicle.

11. The system of claim 4, further comprising a heat sensor.

12. The system of claim 4, wherein the communications interface broadcasts an audible alert upon activation of the impact sensor.

13. The system of claim 4, wherein the communications interface comprises an audible alert system that warns vehicle occupants of an approaching vehicle.

14. The system of claim 4, wherein the communications interface comprises an audible alert system that asks vehicle occupants one or more questions, and if vehicle occupants are non-responsive, automatically contacts an emergency responder.

15. An apparatus for signaling the presence of a disabled vehicle, comprising:
   a flare comprising:
      a housing comprising two opposing circular end faces and a curved lateral face disposed therebetween;
      a lighting element disposed on the lateral face of the housing; and
      a power source configured to energize the lighting element; and
   a compartment configured to store the flare, wherein the compartment is configured to eject the flare from the compartment upon the compartment receiving a signal from a host vehicle that the host vehicle has experienced an impact.

16. The apparatus of claim 15, wherein the lighting element comprises a plurality of lighting elements.

17. The apparatus of claim 15, further comprising a sensor selected from the group consisting of an impact sensor and a heat sensor.

18. A vehicle collision avoidance vehicle alert system, comprising:
   an impact sensor configured to generate a signal when the impact sensor detects an impact;
   a deployment device configured to receive the signal from the impact sensor; and
   a housing comprising a flare, wherein the housing is configured to eject the flare from the housing when the deployment device receives the signal from the impact sensor,
   a communications interface configured to receive the signal from the impact sensor, wherein the communications interface initiates an emergency notification in response to receiving the signal from the impact sensor,
   wherein the communications interface comprises an audible alert system that asks vehicle occupants one or more questions, and if vehicle occupants are non-responsive, automatically contacts an emergency responder.

19. The system of claim 18, wherein the flare further comprises a LED; and a power source configured to power the LED when the flare is ejected from the housing.

20. The system of claim 18, wherein the communications interface causes an exterior light of a host vehicle to illuminate.

* * * * *